(12) United States Patent  (10) Patent No.: US 6,607,297 B2
Egawa  (45) Date of Patent: Aug. 19, 2003

(54) SPREAD ILLUMINATING APPARATUS INCLUDING INCLINED LIGHT SCATTERING PORTIONS

(75) Inventor: Motoji Egawa, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/964,330

(22) Filed: Sep. 28, 2001

(65) Prior Publication Data
US 2002/0041500 A1 Apr. 11, 2002

(30) Foreign Application Priority Data
Oct. 5, 2000 (JP) ........................................ 2000-306080

(51) Int. Cl.⁷ ............................................... F21V 8/00
(52) U.S. Cl. ........................... 362/551; 362/31; 362/558
(58) Field of Search ........................... 362/31, 327, 330, 362/551, 558; 385/901

(56) References Cited

U.S. PATENT DOCUMENTS 5,664,862 A * 9/1997 Redmond et al. ............. 362/31
5,857,761 A * 1/1999 Abe et al. ................... 362/551
5,915,855 A * 6/1999 Murase et al. ................ 362/31
2002/0008969 A1 * 1/2002 Mabuchi et al. .............. 362/31

FOREIGN PATENT DOCUMENTS

JP  2000-231814 A  8/2000

* cited by examiner

Primary Examiner—Alan Cariaso
(74) Attorney, Agent, or Firm—Oliff & Berridge, PLC

(57) ABSTRACT

There is provided a spread illuminating apparatus in which a bar-like light source radiates light more uniformly. Light scattering portions are formed to be inclined in a longitudinal direction of a light conductive member such that irradiation ranges of adjacent light scattering portions overlap partially with each other in the longitudinal direction of the light conductive member. Light ranges ($L_{a1}$, $L_{a2}$, $L_{a3}$, $L_{a4}$ and $L_{a5}$) in a longitudinal direction of the light conductive member per beam of light reflected at the light scattering portions and entering a transparent substrate are expanded so as to overlap partially with each other. Accordingly, the light conductive member includes no part that the light reflected at an optical path conversion means of the light conductive member does not cover in the longitudinal direction of the light conductive member. Thus, the light conductive member constitutes a light source that spreads uninterrupted linear light even on a microscopic level.

14 Claims, 5 Drawing Sheets

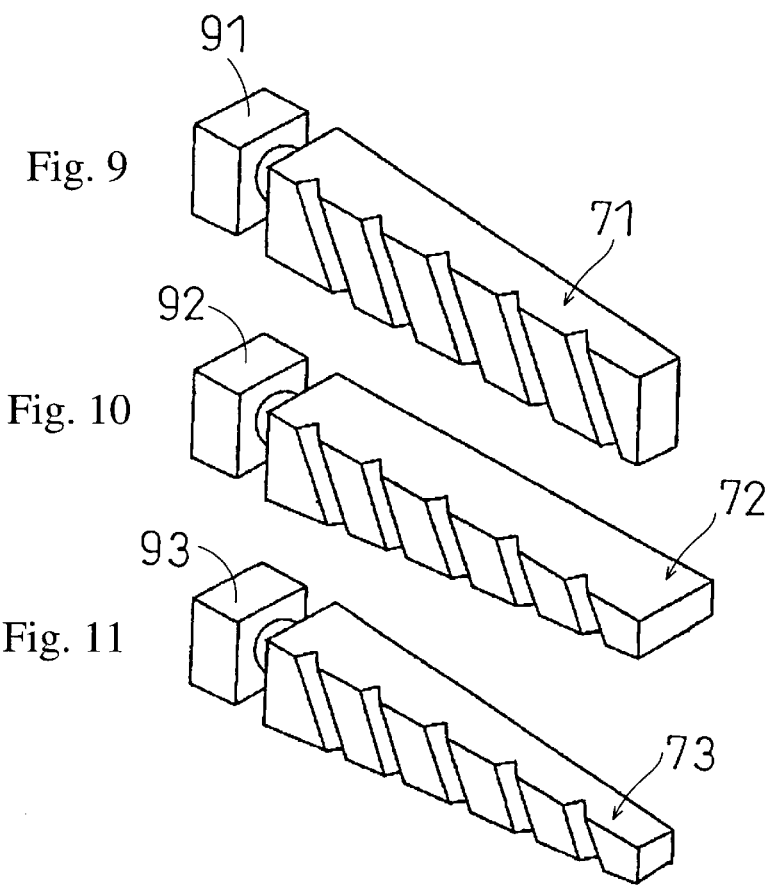
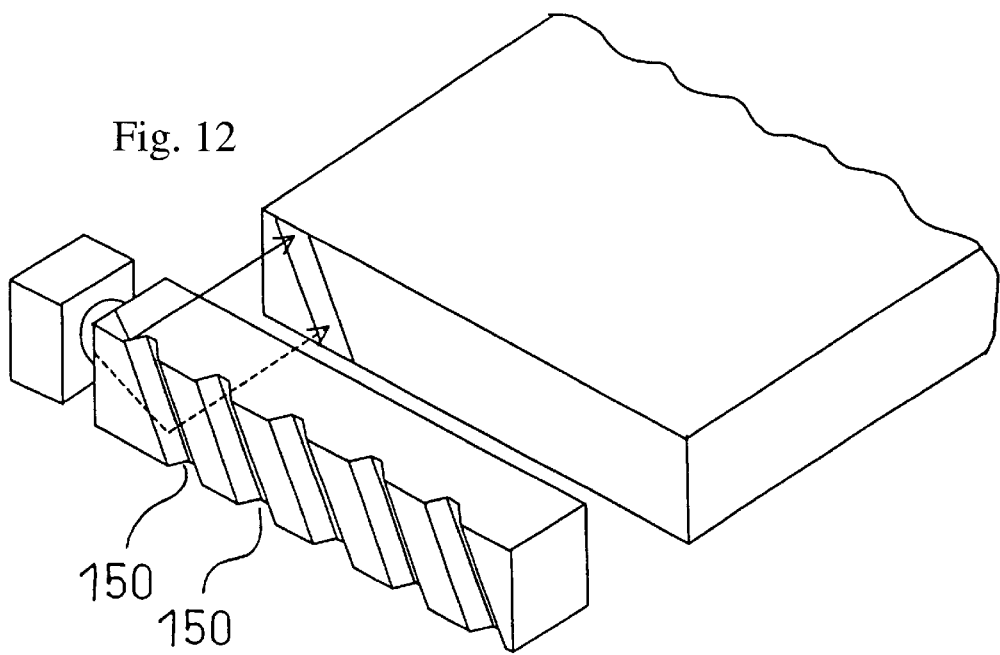

SPREAD ILLUMINATING APPARATUS INCLUDING INCLINED LIGHT SCATTERING PORTIONS

BACKGROUND OF THE INVENTION

1. Field of the Invention

The present invention relates to a spread illuminating apparatus, and more particularly to a spread illuminating apparatus used as an illuminating means for a liquid crystal display device.

2. Description of the Related Art

A demand for a liquid crystal display device operating in a low power consumption is increasing mainly for personal computers or portable telephones due to its low profile and light weight. Since a liquid crystal of the liquid crystal display device does not emit light by itself unlike a light emitting element such as a cathode-ray tube, a separate illuminating means is required when using the device in dark places. To satisfy the recent demand for downsizing and energy saving on electronic products, a spread illuminating apparatus of side light type (light conductive plate type) is used as an illuminating means for the liquid crystal display device.

FIG. 5 is a schematic view of a spread illuminating apparatus of side light type. In general, a spread illuminating apparatus 1 is constituted in such a manner that a bar-like light source 4 is disposed close to an end surface 3 of a transparent substrate 2 made of a light-transmissible material. The transparent substrate 2 formed into a plate-like rectangle has a light reflection pattern 17 on an upper surface thereof. The light reflection pattern 17 is composed of a plurality of grooves 18 substantially triangular in section and flat portions 19 adjacent to the grooves 18, both formed parallel to the end surface 3.

In order to achieve a uniform radiation on a surface of the transparent substrate 2 irrespective of the distance from the light source 4, the grooves 18 of the light reflection pattern 17 are disposed with different intervals from place to place. Specifically, the ratio of an occupied area of the grooves 18 to an occupied area of the flat portions 19 is set to gradually increase in proportion to the increase in distance from the end surface 3 of the transparent substrate 2. The above grooves 18 are not recognizable when viewing the screen because of their very fine constitution.

The light source 4 is generally composed of a bar-like light conductive member 7 made of a transparent material and a spot-like light source 9 disposed facing to an end of the light conductive member 7, and disposed close to the end surface 3 of the transparent substrate 2. And, the light conductive member 7 is provided with an optical path conversion means 11. The optical path conversion means 11 is formed at a surface 14 opposite to a surface 13 facing the end surface 3 of the transparent substrate 2 in such a manner, for example, that grooves triangular in section as light scattering portions 15 are provided so as to run in a thickness direction of the light conductive member 7, whereby light emitted from the spot-like light source 9 uniformly enters the end surface 3 of the transparent substrate 2.

In order for light to be uniformly emitted from the light conductive member 7, the triangular grooves are desirably formed such that the depth increases gradually in proportion to the increase in distance from the spot-like light source 9. And, for effectively using light traveling in the light conductive member 7, it is preferable to provide a light reflection member 12 substantially U-shaped in section so as to cover longitudinal peripheral surfaces except the surface 13 facing the end surface 3 of the transparent substrate 2 and the vicinity of the end surface 3 of the transparent substrate 2 thereby preventing light from leaking from the light conductive member 7.

In the optical path conversion means of the light conductive member 7, in case the light scattering portions 15 and flat portions 16 are alternately arranged, only the light scattering portions 15 function substantially to reflect light into the transparent substrate 2 as shown in FIG. 6. Consequently, on a microscopic level, the optical path conversion means emits light with a plurality of luminous and dark portions thus illuminating the transparent substrate 2 with a plurality of light beams L although visually not recognizable. As a solution to the above, the present inventors came up with an idea that a diffusion plate 20 is provided between the light conductive member 7 and the transparent substrate 2 as shown in FIGS. 7 and 8, and Japanese Patent Application Laid-open No. 2000-231814 discloses the detail thereof.

However, in the conventional structure shown in FIGS. 7 and 8, the idea must have the diffusion plate 20 provided as an additional component, which is small in thickness and width thereby giving difficulties in handling and assembling, and making a cost increase inevitable. Further, the fact that light passes through the diffusion plate 20 causes light transmissivity to decrease and the light to diffuse, thereby lowering luminance and contrast.

SUMMARY OF THE PRESENT INVENTION

The present invention has been made in the light of the above, and its object is to make linear light beams of a spread illuminating apparatus more uniform, thereby making its illumination spread more uniformly and at the same time improving luminance and contrast without increasing the number of components.

In order to solve the above problems, according to a first aspect of the present invention, in a spread illuminating apparatus of side light type which comprises a light source composed of a bar-like light conductive member made of a transparent material and a spot-like light source and disposed close to an end surface of a transparent substrate made of a light-transmissible material, at least one surface of the bar-like light conductive member has an optical path conversion means comprising a plurality of light scattering portions which are inclined in a longitudinal direction of the light conductive member.

The light scattering portions inclined in the longitudinal direction of the light conductive member expands an area range per light scattering portion in the longitudinal direction of the light conductive member, which expands an irradiation range per beam of light that is reflected at the light scattering portions and enters the transparent substrate, thereby narrowing a range per dark portion in the light conductive member even on a microscopic level.

According to a second aspect of the present invention, in the spread illuminating apparatus, the light scattering portions are formed in such a manner that the irradiation ranges of adjacent light scattering portions overlap partially with each other in the longitudinal direction of the light conductive member. In accordance with the structure, the irradiation ranges of light reflected at the respective adjacent light scattering portions overlap partially with each other, whereby light beams coming from the light conductive member and entering the transparent substrate can constitute uninterrupted illumination in the longitudinal direction of the light conductive member.

According to a third aspect of the present invention, in the spread illuminating apparatus, an inclination angle θ of the light scattering portions is set: $\theta \geq \tan^{-1}(p/t)$ where t is the thickness of the light conductive member and p is the pitch of the light scattering portions.

When the inclination angle θ is set to satisfy the condition, the adjacent light scattering portions can overlap with each other in the longitudinal direction of the light conductive member. Thus, the ranges of light beams reflected at the adjacent light scattering portions overlap with each other, whereby light coming from the light conductive member can enter the transparent substrate in an uninterrupted manner with regard to the longitudinal direction of the light conductive member.

According to a fourth aspect of the present invention, in the spread illuminating apparatus, the light scattering portion is formed to be a groove. With the above formation of the light scattering portion, light is reflected so as to be guided from the light conductive member into the transparent substrate.

According to a fifth aspect of the present invention, in the spread illuminating apparatus, the optical path conversion means is composed of a plurality of grooves and a plurality of flat portions adjacent thereto. In accordance with the above structure, the grooves function as the light scattering portions to reflect and guide light from the light conductive member into the transparent substrate.

According to a sixth aspect of the present invention, in the spread illuminating apparatus, the grooves are shaped triangular in section, and according to a seventh aspect of the present invention, the grooves are shaped trapezoidal in section. A plurality of grooves with the above shapes function as the light scattering portions to reflect and guide light from the light conductive member into the transparent substrate.

According to an eighth aspect of the present invention, in the spread illuminating apparatus, the bar-like light conductive member may be formed in such a manner that either or both of the thickness and width thereof decrease from an end having the spot-like light source toward an opposite end so that the light conductive member has its minimum cross section at the opposite end. By reducing light leaking from the opposite end with the above construction, light can be uniformly radiated from the whole of the light conductive member irrespective of the distance from the spot-like light source thereby efficiently guiding the light into the transparent substrate.

BRIEF DESCRIPTION OF THE DRAWINGS

In the accompanying drawings:

FIG. 9 is a schematic diagram showing an exemplary light conducting member where a width of the light conductive member decrease with distance from a light source;

FIG. 10 is a schematic diagram showing an exemplary light conductive member where a thickness of the light conducting member decreases with distance from a light source;

FIG. 11 is a schematic diagram of an exemplary light conductive member where both a thickness and a width of the light conductive member decrease with distance from a light source; and FIG. 12 is a schematic diagram showing an exemplary light conducting member where a plurality of grooves are each formed to be trapezoidal in section.

DETAILED DESCRIPTION OF THE PREFERRED EMBODIMENT

Figure 1:
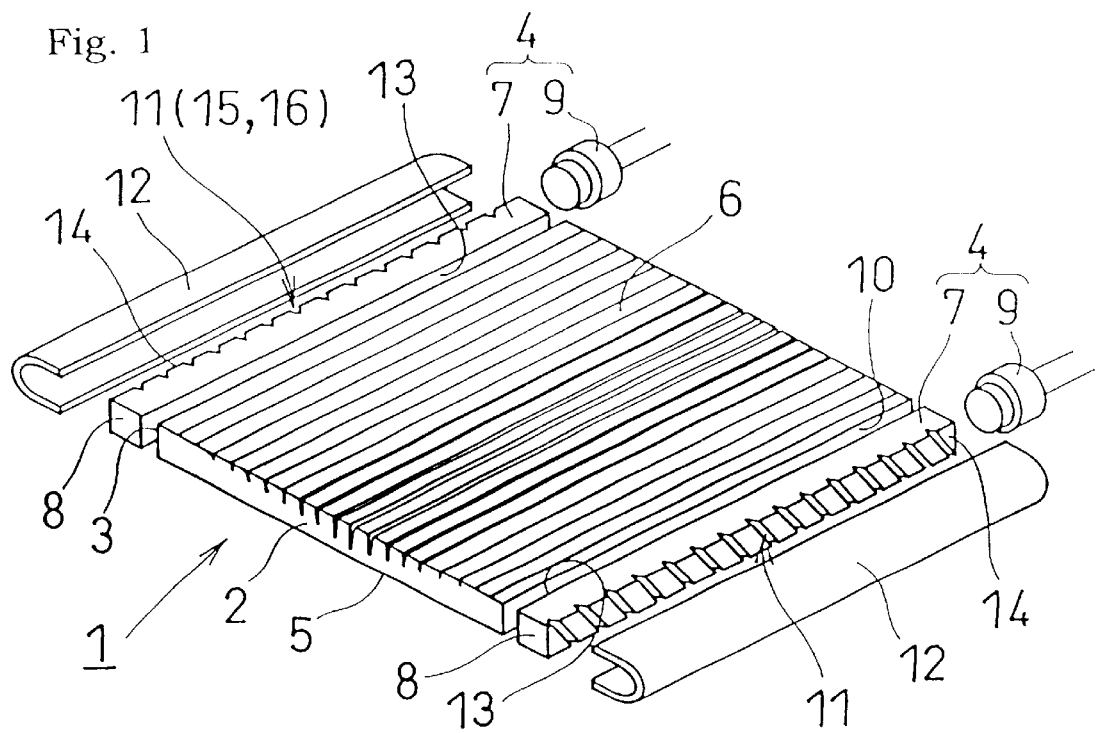
FIG. 1 is a schematic diagram showing a spread illuminating apparatus of side light type according to an embodiment of the present invention.

Preferred embodiments of the present invention will be hereinafter described with reference to accompanying drawings. Parts identical with or corresponding to those in conventional arts are denoted by the same reference numerals and the detail thereof is omitted.

FIG. 1 schematically shows a spread illuminating apparatus of side light type according to an embodiment of the present invention. In the embodiment of the present invention, an optical path conversion means 11 is composed of a plurality of light scattering portions 15 each consisting of a groove substantially triangular in section and a plurality of flat portions 16 adjacent to the scattering portions 15. Further, the light scattering portions 15 are formed in parallel to each other and are inclined in a longitudinal direction of a light conductive member 7 and irradiation ranges by respective adjacent light scattering portions 15 overlap partially with each other in the longitudinal direction of the light conductive member 7.

Figure 2:
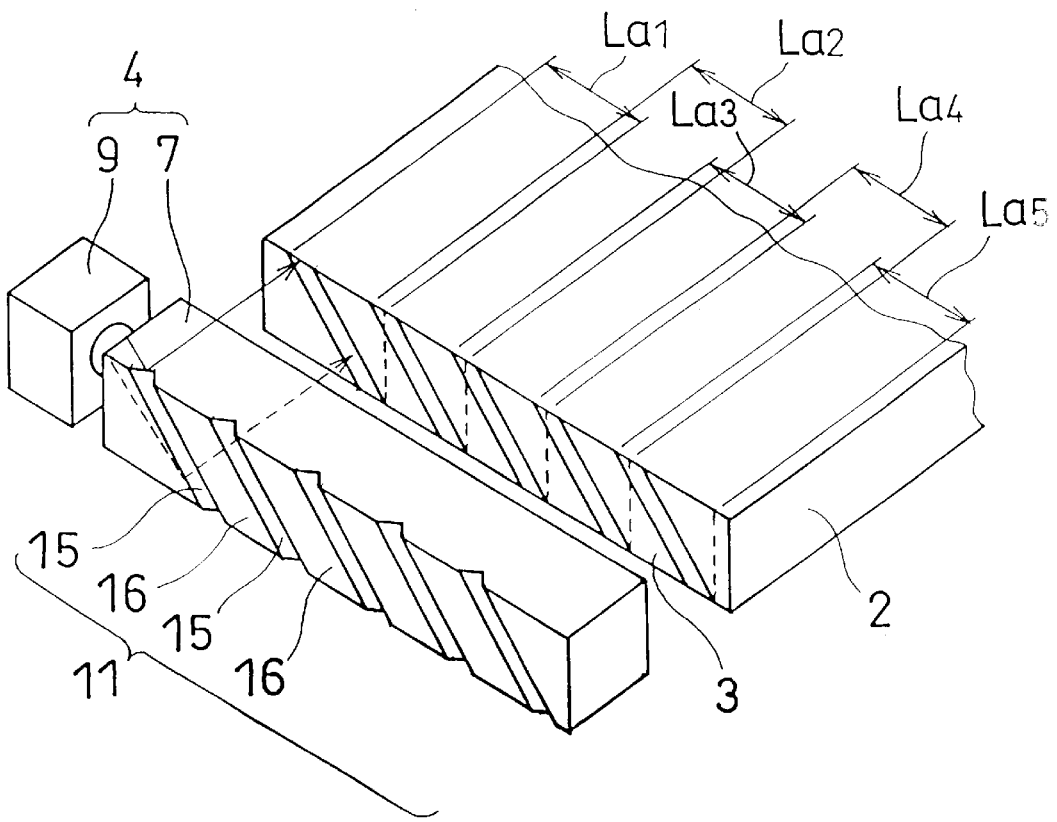
FIG. 2 is a schematic diagram showing an irradiation range of a light beam which enters a transparent substrate in the spread illuminating apparatus of side light type of FIG. 1.

In this way, the light scattering portions 15 each consisting of a groove are inclined in the longitudinal direction of the light conductive member 7, whereby, in respect of light reflected at the light scattering portions 15 and entering a transparent substrate 2, respective irradiation ranges $L_{a1}$, $L_{a2}$, $L_{a3}$, $L_{a4}$ and $L_{a5}$ per light beam in the longitudinal direction of the light conductive member 7 can be expanded and further overlap partially with each other as shown in FIG. 2.

In the example of FIG. 2, the range $L_{a2}$ overlaps with both its adjacent ranges $L_{a1}$ and $L_{a3}$, and the range $L_{a4}$ overlaps with both its adjacent ranges $L_{a3}$ and $L_{a5}$. Thus, light coming from the light conductive member 7 and entering the transparent substrate 2 can be formed uninterrupted with regard to the longitudinal direction of the light conductive member 7. Accordingly, the light conductive member 7 is totally covered with light reflected by the optical path conversion means 11 and can provide uninterrupted linear light even on a microscopic level.

Further, light which enters an end surface 3 of the transparent substrate 2 travels toward an opposite end surface 10 while being reflected between an upper surface 6 and a lower surface 5 of the transparent substrate 2 (see FIG. 1). During such a process, light beams having the respective ranges $L_{a1}$, $L_{a2}$, $L_{a3}$, $L_{a4}$ and $L_{a5}$ are mixed with each other so that uneven brightness due to light and dark portions on the transparent substrate 2 is hardly noticeable even on a microscopic level.

Consequently, the radiation of the spread illuminating apparatus 1 can be more uniformly spread and the luminance and contrast thereof can be further improved. In addition, these improvements can be realized without any additional components such as a diffusion plate 20 disposed between the light conductive member 7 and the transparent substrate 2 as in the conventional art.

Figure 3:
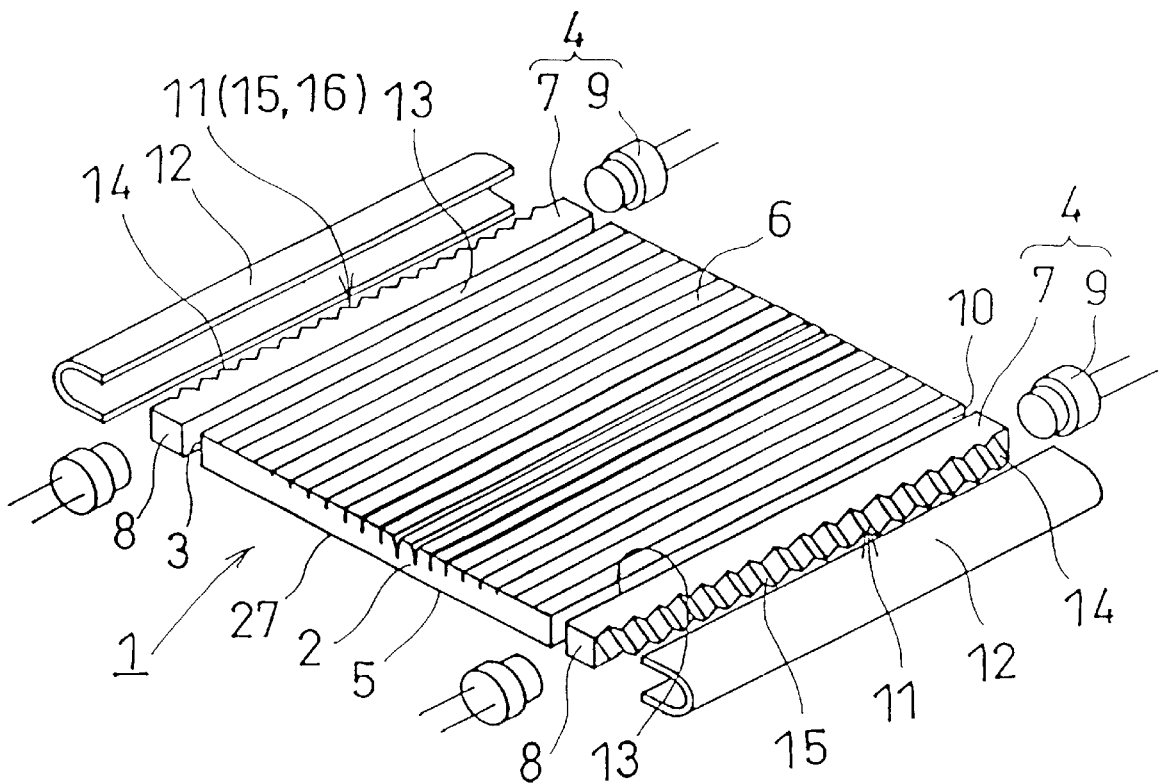
FIG. 3 is a schematic diagram showing an applied example of the spread illuminating apparatus of side light type of FIG. 1.
Figure 7:
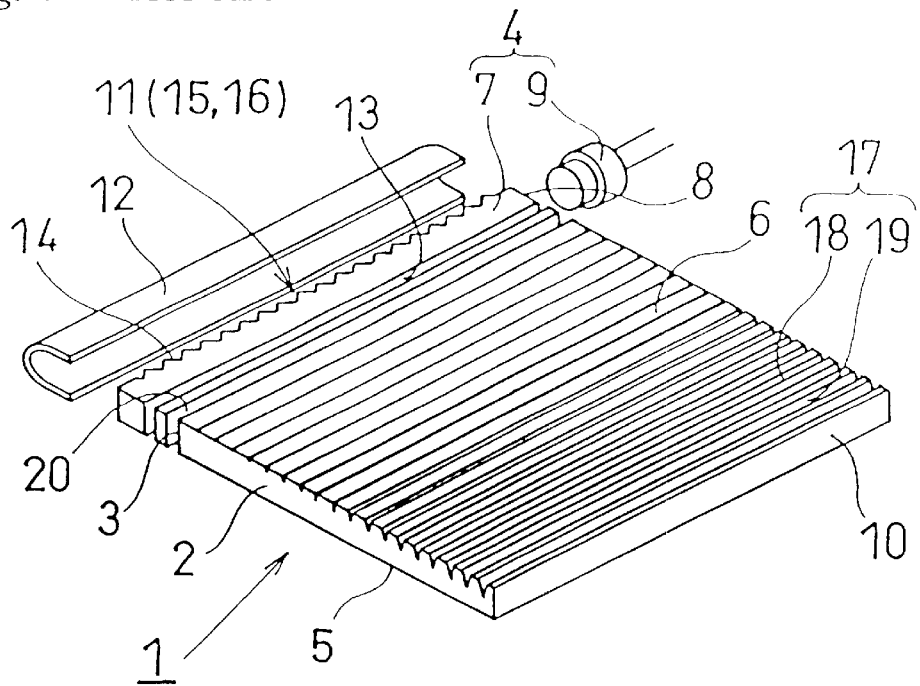
FIG. 7 is a schematic diagram showing the conventional spread illuminating apparatus of a side light type in which measures are taken against uneven radiation.
Figure 8:
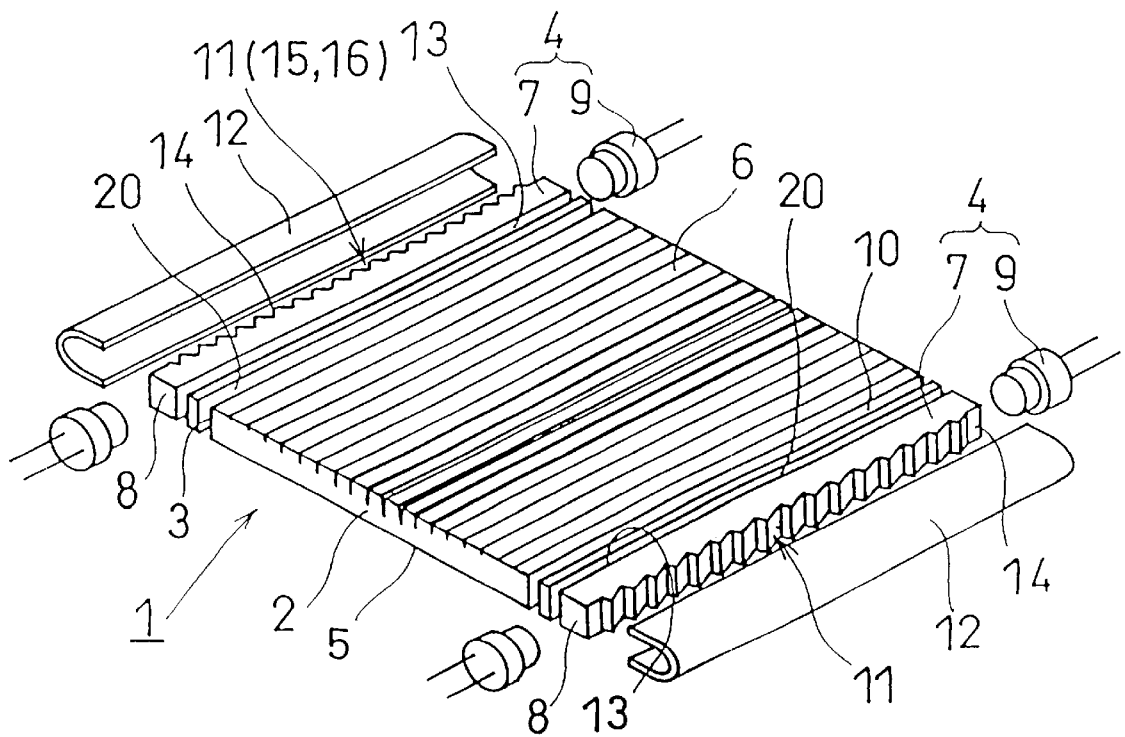
FIG. 8 is a schematic diagram showing the conventional spread illuminating apparatus of a side light type in which measures are taken against uneven radiation.

Incidentally, the present invention can be applied not only when the light conductive member 7 has a spot-like light source 9 provided only at one end surface 8 as shown in FIG. 1, but also when the light conductive member 7 has respective spot-like light sources 9 each provided at both end surfaces 8 as shown in FIG. 3. Further, the light scattering portions 15 may each be an inclined groove triangle in section and in series form a stair-like configuration as seen on the optical path conversion means 11 of the light conductive member 7 shown in FIG. 3. Moreover, it can be applied when a light source 4 is provided only at the one end surface 3 of the transparent substrate 2 similar to the conventional example of FIG. 7.

As shown in FIG. 1, when the spot-like light source 9 is provided only at the one end surface of the light conductive member 7, the depth of the light scattering portions 15 (triangular grooves) provided in the light conductive member 7 is made to increase in proportion to the increase in distance from the spot-like light source 9, whereby light can be more uniformly radiated from the entire light conductive member 7. In addition, as shown in FIG. 3, when the spot-like light source 9 is provided at the both end surfaces 8 of the light conductive member 7, the step dimension or depth of the light scattering portions 15 is made to measure largest at the central portion in the longitudinal direction of the light conductive member 7, whereby light can be further uniformly radiated from the entire light conductive member 7.

Further, a direction of inclination of the light scattering portions 15 is not limited to what is shown in FIGS. 1 to 3, and also the sectional shape of the light scattering portions 15 is not limited to a triangle but may be trapezoid, such as, for example, the light scattering portions 150 shown in FIG. 12.

Moreover, to realize an improved brightness over the entire light conductive member 7 for more uniform irradiation, the light conductive member 7 may be formed in a wedge such that either or both of the thickness and width of the light conductive member 7 decrease with the increase in distance from the spot-like light source 9, which makes the cross section of the light conductive member 7 minimum at an opposite end to the end at which the spot-like light source is disposed. With the above construction, light leaking from the opposite end can be reduced and light can be uniformly radiated from the whole of the light conductive member 7 irrespective of the distance from the spot-like light source 9 thereby efficiently guiding light into the transparent substrate 2.

When diminishing the light conductive member 7 with regard to the thickness, an upper surface of the light conductive member 7 may be in parallel with the longitudinal axis of the light conductive member 7 while a lower surface thereof may be inclined with respect to the longitudinal axis of the light conductive member 7, and vice versa. Moreover, both the upper and lower surfaces of the light conductive member 7 may be inclined with respect to the longitudinal axis of the light conductive member 7. On the other hand, when diminishing the light conductive member 7 with regard to the width, a surface 13 that faces the end surface 3 of the transparent substrate 2 may be in parallel with the longitudinal axis of the light conductive member 7 while a surface 14 opposite to the surface 13 may be inclined with respect to the longitudinal axis of the light conductive member 7, and vice versa. Furthermore, both the surfaces 13 and 14 may be inclined with respect to the longitudinal axis of the light conductive member 7. And, an appropriate wedge-shape may be selected as necessity requires, and, inclination angles of surfaces may be set so that light can be most uniformly radiated from the light conductive member 7 irrespective of the distance from the spot-like light source 9.

Embodiment

Figure 4:
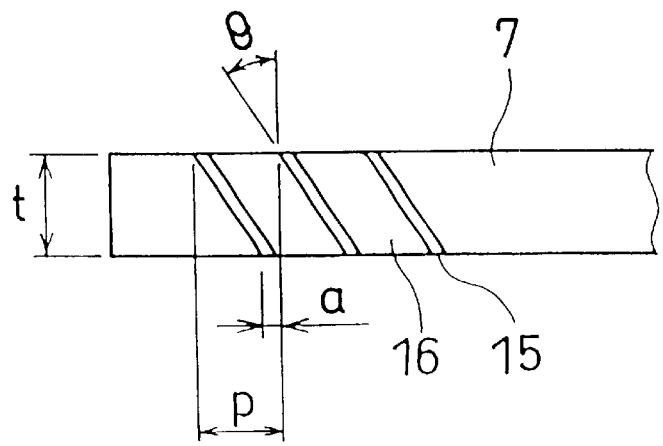
FIG. 4 is an explanatory diagram showing a specific method for making adjacent light scattering portions overlap with each other in a longitudinal direction of a light conductive member.
Figure 5:
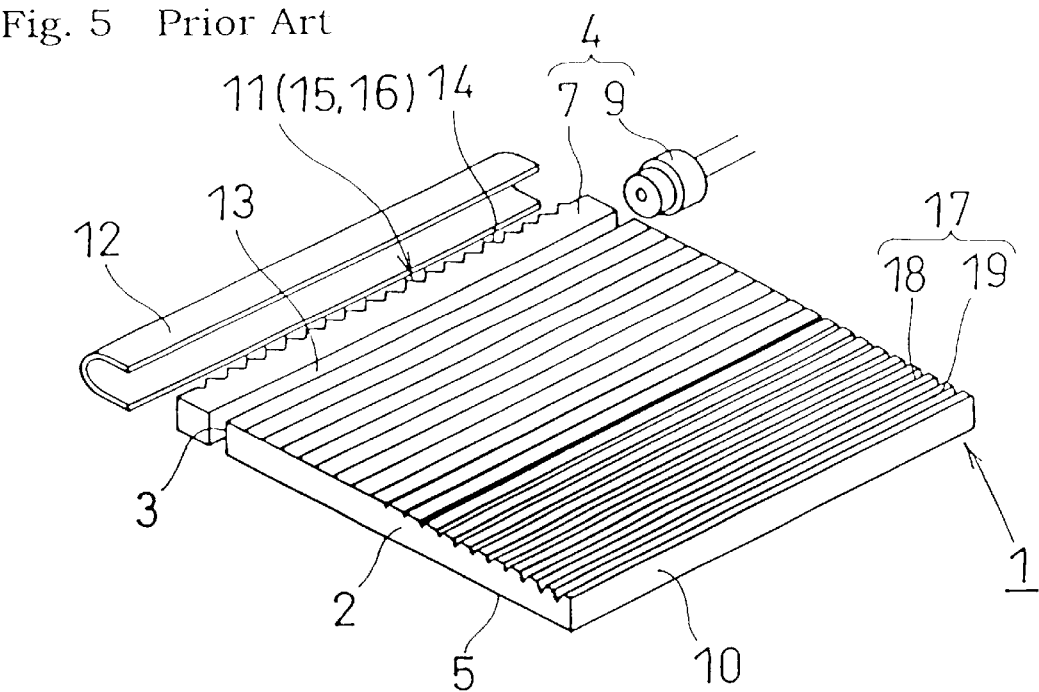
FIG. 5 is a schematic diagram showing a conventional spread illuminating apparatus of side light type.
Figure 6:
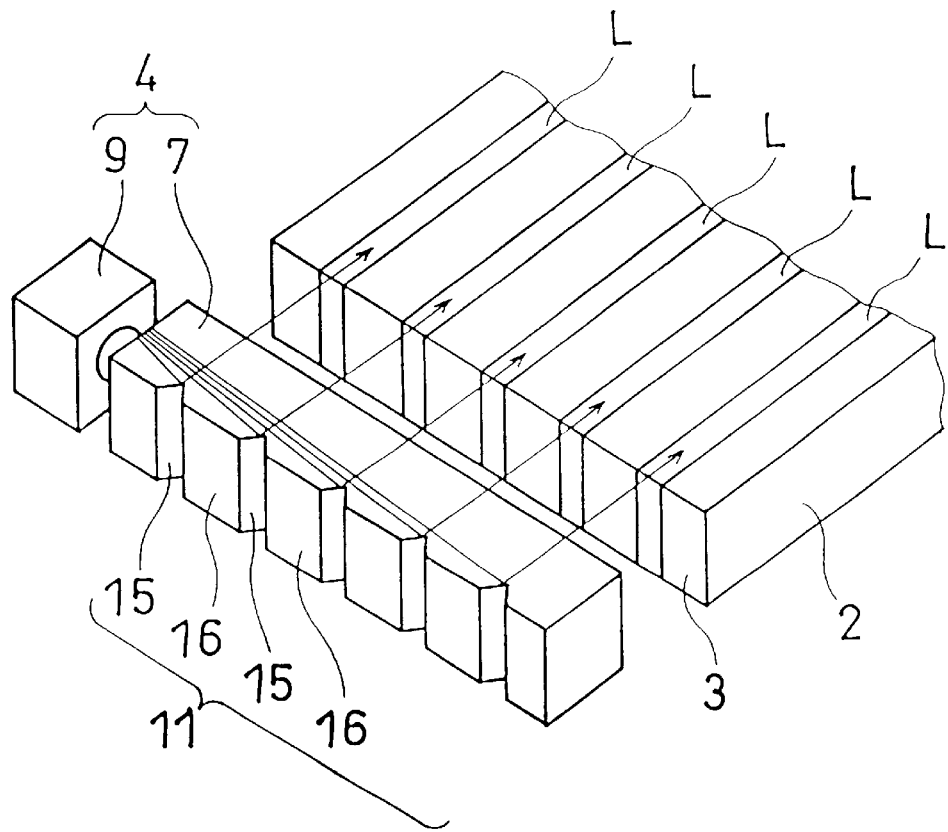
FIG. 6 is a schematic diagram showing irradiation ranges of light beams which enter a transparent substrate in the conventional spread illuminating apparatus of side light type.

A specific method for forming light scattering portions 15 to be inclined in a longitudinal direction of a light conductive member 7 thereby overlapping irradiation ranges of adjacent light scattering portions 15 partially with each other in the longitudinal direction of the light conductive member 7 will be described with reference to FIG. 4. As shown in FIG. 4, a thickness of the light conductive member 7 is denoted by t, a pitch of the light scattering portions 15 is by p, an inclination angle of the light scattering portions 15 in the longitudinal direction of the light conductive member 7 is by θ, and a range of dark stripes in the longitudinal direction, which can be recognized when the light conductive member 7 is observed microscopically, is by a. On such conditions, a relation of the inclination angle $\theta = \tan^{-1}(p/t)$ is established when the range a=0. Accordingly, with the relation of $\theta \geq \tan^{-1}(p/t)$, the irradiation ranges of adjacent light scattering portions 15 overlap partially with each other in the longitudinal direction of the light conductive member 7.

FIG. 9 is a schematic diagram that shows an exemplary light conductive member 71 where a width of the light conductive member decreases with distance from a light source 91. FIG. 10 is a schematic diagram of an exemplary light conductive member 72 where a thickness of the light conductive member 72 decreases with distance from a light source 92. FIG. 11 is a schematic diagram of an exemplary light conductive member 73 where both a thickness and a width of the light conductive member 73 decrease with distance from a light source 93.

For example, when the thickness t of the light conductive member 7=1, and the pitch p of the light scattering portions 15=0.2, the inclination angle θ is given by $\tan^{-1}(p/t) = \tan^{-1}(0.2/1) = 11.5°$. Accordingly, with the $\theta \geq 11.5°$, the irradiation ranges of the adjacent light scattering portions 15 overlap partially with each other in the longitudinal direction of the light conductive member 7.

In accordance with the above-described structure, the present invention has the following effects. First, according to the first aspect of the present invention, the spread illuminating apparatus can provide a more uniformly spread radiation while improving luminance and contrast without increasing the number of components. Accordingly, visibility in the spread illuminating apparatus can be improved.

According to the second aspect of the present invention, light can be more uniformly radiated from the bar-like light source of the spread illuminating apparatus. Thus, the spread illuminating apparatus can provide a more uniformly spread radiation while improving luminance and contrast.

According to the third aspect of the present invention, the adjacent light scattering portions overlap with each other in the longitudinal direction of the light conductive member. Thus, the bar-like light source of the spread illuminating apparatus can radiate light more uniformly.

According to the fourth aspect of the present invention, grooves provided on the light conductive member reflect and guide light into the transparent substrate. Thus, the spread illuminating apparatus can radiate light more uniformly.

According to the fifth aspect of the present invention, a plurality of grooves function as the light scattering portions to reflect and guide light from the light conductive member into the transparent substrate. Thus, the spread illuminating apparatus can radiate light more uniformly.

According to the sixth aspect of the present invention, the grooves substantially triangular in section function as the light scattering portions to reflect light. Also, according to the seventh aspect of the present invention, the grooves substantially trapezoidal in section function as the light scattering portions to reflect light. The light scattering portions reflect and guide light from the light conductive member into the transparent substrate. Thus, the spread illuminating apparatus can radiate light more uniformly.

According to the eighth aspect of the present invention, the uniform radiation from the entire light conductive member is facilitated so as to make uniform light guided from the light conductive member into the transparent substrate and to further a uniform illumination of the spread illuminating apparatus.

What is claimed is:

1. A spread illuminating apparatus of side light type which includes a bar-like light source comprising a bar-like light conductive member made of a transparent material and a spot-like light source, and disposed close to an end surface of a transparent substrate made of a light-transmissible material, wherein a plurality of light scattering portions of an optical path conversion means are each inclined in a longitudinal direction of said light conductive member as viewed on a surface of said light conductive member on which said plurality of light scattering portions are provided, said surface of said light conductive member is opposite to a surface facing the end surface of the transparent substrate.

2. A spread illuminating apparatus as claimed in claim 1, wherein said light scattering portions are formed such that irradiation ranges of adjacent light scattering portions overlap partially with each other in a longitudinal direction of said light conductive member.

3. A spread illuminating apparatus as claimed in claim 1, wherein an inclination angle θ of said light scattering portions is set to meet $\theta \geq \tan^{-1}(p/t)$ where t is a thickness of said light conductive member and p is a pitch of said light scattering portions.

4. A spread illuminating apparatus as claimed in claim 1, wherein said light scattering portions are each formed to be a groove.

5. A spread illuminating apparatus as claimed in claim 1, wherein said optical path conversion means is composed of a plurality of grooves and a plurality of flat portions adjacent to said plurality of grooves.

6. A spread illuminating apparatus as claimed in claim 5, wherein said plurality of grooves are each formed to be triangular in section.

7. A spread illuminating apparatus as claimed in claim 5, wherein said plurality of grooves are each formed to be trapezoidal in section.

8. A spread illuminating apparatus as claimed in claim 1, wherein either or both of a thickness and width of said light conductive member decrease with an increase in distance from said spot-like light source.

9. A spread illuminating apparatus as claimed in claim 2, wherein said light scattering portions are each formed to be a groove.

10. A spread illuminating apparatus as claimed in claim 3, wherein said light scattering portions are each formed to be a groove.

11. A spread illuminating apparatus as claimed in claim 2, wherein said optical path conversion means is composed of a plurality of grooves and a plurality of flat portions adjacent to said plurality of grooves.

12. A spread illuminating apparatus as claimed in claim 3, wherein said optical path conversion means is composed of a plurality of grooves and a plurality of flat portions adjacent to said plurality of grooves.

13. A spread illuminating apparatus as claimed in claim 2, wherein either or both of a thickness and width of said light conductive member decrease with an increase in distance from said spot-like light source.

14. A spread illuminating apparatus as claimed in claim 3, wherein either or both of a thickness and width of said light conductive member decrease with an increase in distance from said spot-like light source.

* * * * *